United States Patent
Castaldo

(10) Patent No.: US 11,317,707 B2
(45) Date of Patent: May 3, 2022

(54) BRUSH HEAD FOR AN ELECTRIC TOOTHBRUSH, AND ASSOCIATED ELECTRIC TOOTHBRUSH

(71) Applicant: Yann Castaldo, Aix en Provence (FR)

(72) Inventor: Yann Castaldo, Aix en Provence (FR)

(73) Assignee: Yann Castaldo, Aix en Provence (FR)

( * ) Notice: Subject to any disclaimer, the term of this patent is extended or adjusted under 35 U.S.C. 154(b) by 132 days.

(21) Appl. No.: 16/707,689

(22) Filed: Dec. 9, 2019

(65) Prior Publication Data
US 2020/0128946 A1    Apr. 30, 2020

Related U.S. Application Data

(63) Continuation of application No. PCT/FR2018/051303, filed on Jun. 6, 2018.

(30) Foreign Application Priority Data

Jun. 8, 2017  (FR) ..................................... 17/55101

(51) Int. Cl.
*A46B 9/04* (2006.01)
*A46B 9/02* (2006.01)
*A46B 13/02* (2006.01)

(52) U.S. Cl.
CPC .............. *A46B 9/045* (2013.01); *A46B 9/028* (2013.01); *A46B 13/023* (2013.01); *A46B 2200/1066* (2013.01)

(58) Field of Classification Search
CPC ....... A46B 9/045; A46B 9/028; A46B 13/023; A46B 13/02; A46B 2200/1066; A61C 17/3463; A61C 17/3409; A61C 17/34

(Continued)

(56) References Cited

U.S. PATENT DOCUMENTS

| 4,625,357 A * | 12/1986 | DeMartino | A46B 5/02 15/167.1 |
| 5,396,679 A * | 3/1995 | Brown | A46B 7/04 15/167.1 |

(Continued)

FOREIGN PATENT DOCUMENTS

| CN | 2702717 | 6/2005 |
| CN | 201164508 | 12/2008 |

(Continued)

OTHER PUBLICATIONS

International Search Report for International Application PCT/FR/2018/051303, dated Nov. 14, 2018.

*Primary Examiner* — Joseph J Hail
*Assistant Examiner* — Caleb Andrew Holizna
(74) *Attorney, Agent, or Firm* — Burris Law, PLLC

(57) ABSTRACT

A brush head for an electric toothbrush includes a support part supporting upper and lower lateral brush elements and transverse brush elements for the combined brushing of the inner, outer and occlusal surfaces of the upper and lower teeth, and an oscillating device intended to impart an oscillating movement to the support part. The support part is elastically deformable such that it can fit snugly against the upper and lower dental arches during brushing. The oscillating device includes a movable part on which the support part is mounted, and a drive shaft coupled to the movable part in order to move the movable part and the support part in an oscillating manner. The movable part extends between the upper lateral brush elements and the lower lateral brush elements.

22 Claims, 11 Drawing Sheets

(58) Field of Classification Search
USPC .......................................................... 15/167.1
See application file for complete search history.

(56) References Cited

U.S. PATENT DOCUMENTS

| | | | |
|---|---|---|---|
| 8,745,802 | B2 | 6/2014 | Steur |
| 8,887,338 | B1* | 11/2014 | Brar ...................... A46B 9/045 |
| | | | 15/22.1 |
| 2011/0138563 | A1 | 6/2011 | Phgura |
| 2011/0191971 | A1 | 8/2011 | Zeng |
| 2011/0258794 | A1* | 10/2011 | Headstrom ........ A61C 17/3463 |
| | | | 15/22.2 |

FOREIGN PATENT DOCUMENTS

| | | |
|---|---|---|
| CN | 102186435 | 9/2011 |
| CN | 102271614 | 12/2011 |
| CN | 203841821 | 9/2014 |
| CN | 204192782 | 3/2015 |
| DE | 20120955 | 6/2002 |
| FR | 2849591 | 7/2004 |
| GB | 1331646 | 9/1973 |

* cited by examiner

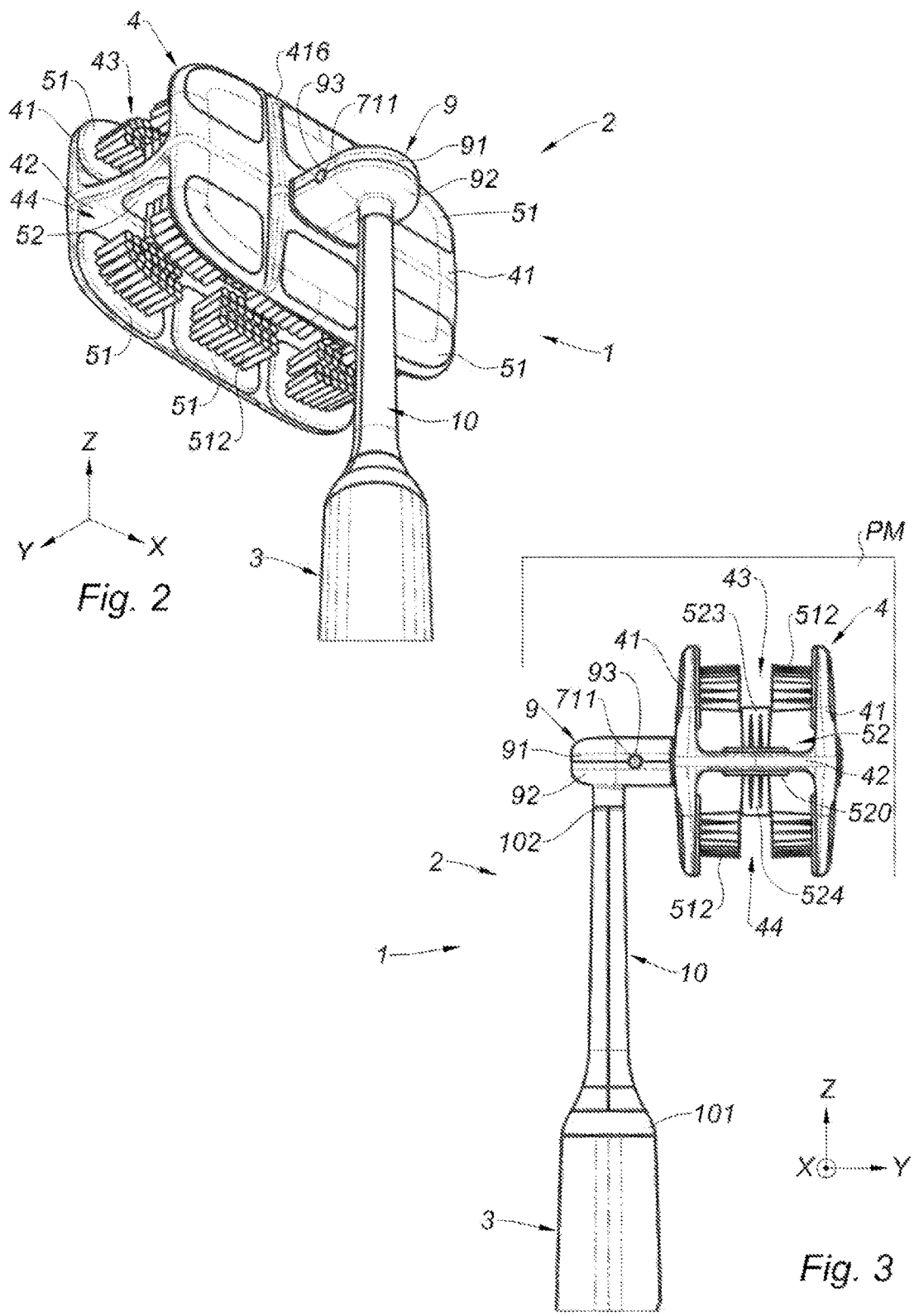

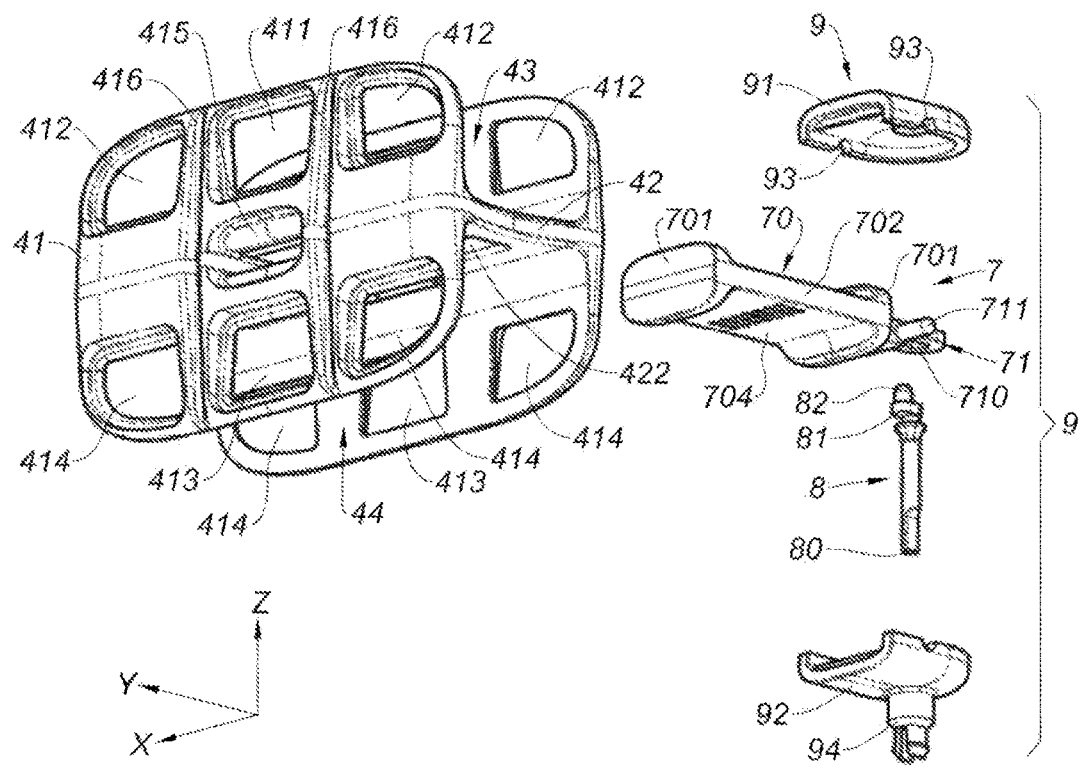
Fig. 5
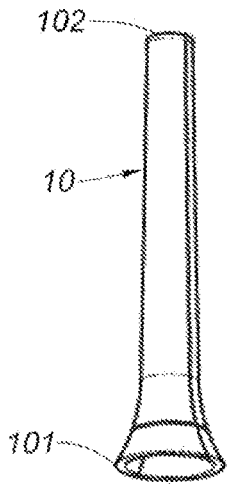

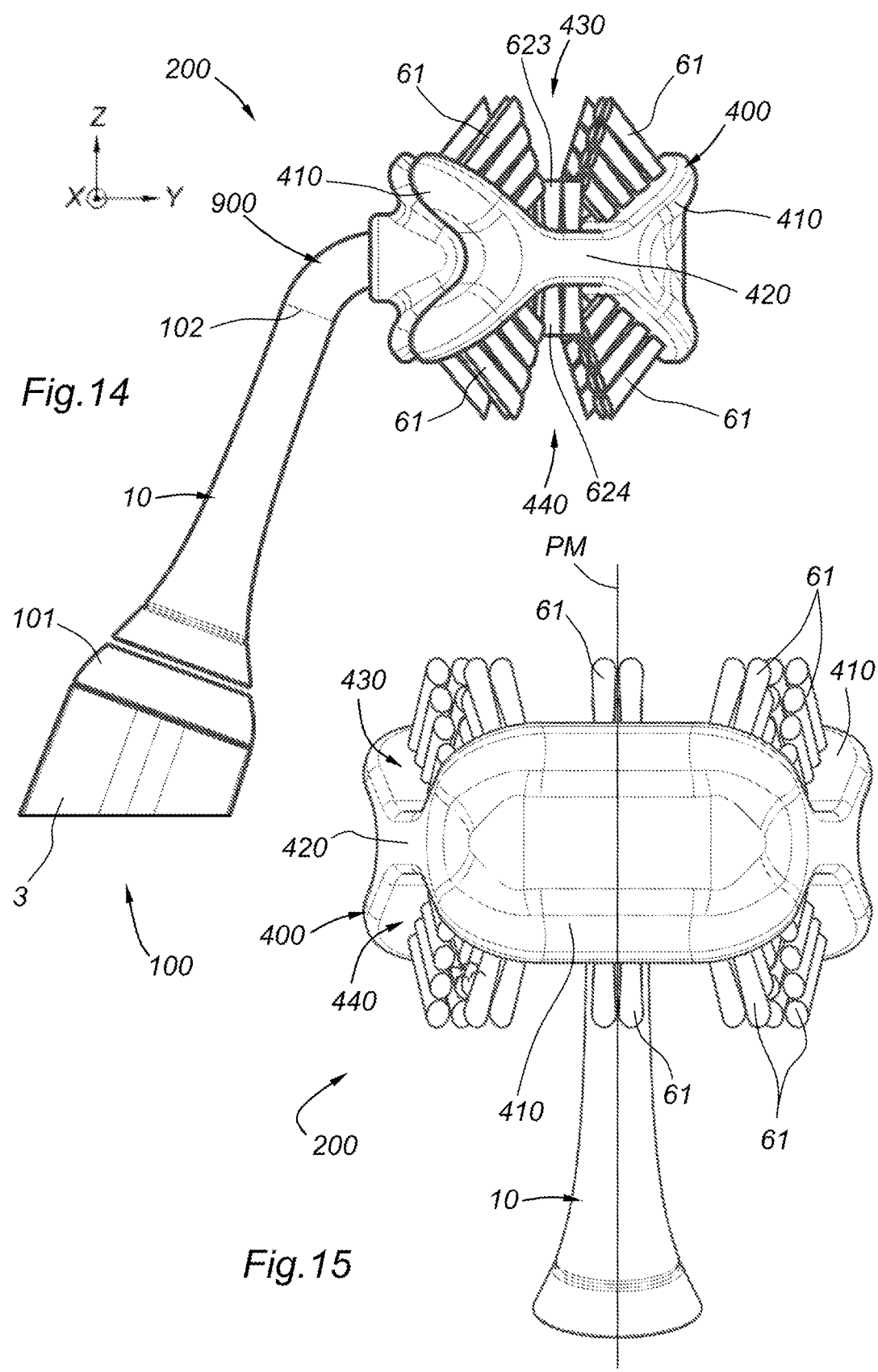

BRUSH HEAD FOR AN ELECTRIC TOOTHBRUSH, AND ASSOCIATED ELECTRIC TOOTHBRUSH

CROSS-REFERENCE TO RELATED APPLICATIONS

This application is a continuation of International Application No. PCT/FR2018/051303, filed on Jun. 6, 2018, which claims priority to and the benefit of FR 17/55101, filed on Jun. 8, 2017. The disclosures of the above applications are incorporated herein by reference.

FIELD

The present disclosure relates to a brush head for an electric toothbrush, as well as to an electric toothbrush equipped with such a brush head.

BACKGROUND

The statements in this section merely provide background information related to the present disclosure and may not constitute prior art.

In the toothbrushes industry, and in particular electric toothbrushes, it is conventional to use brush heads comprising either a brush animated with a rotary movement, or a brush animated with a vibrating or reciprocating movement.

However, with such brushes, a brushing for several minutes is recommended for it to be complete and efficient, which makes this operation too long and tedious to many persons who, therefore, expedite the brushing in a reduced time which is too short to be efficient.

To address this issue, there is known in particular from the document GB 1 331 646 a toothbrush allowing simultaneously brushing the upper and lower teeth, with a rotary support comprising two rotating disks supporting brush elements. Such a rotary brush is, however, inefficient for a passage of the brush bristles between the teeth.

It is also known from the document FR 2 849 591 A1 to use a toothbrush comprising a block generally shaped as a mouthguard, made of a thermoformable material to adapt it to the morphology of the user after exposing it to a suitable temperature. This block is provided with two opposite faces in each of which an arcuate groove internally lined with brushes is provided. Such a brush is however impractical to use because of the need to preheat the block to conform it to the arcuate shape of the upper and lower dental arches and, furthermore, because of the volume of the block which almost entirely envelops the upper and lower dental arches. Furthermore, when the brushes are worn, it is necessary to replace at least the entire block, which is crippling in terms of cost for the users.

The state of the art may also be illustrated by the teaching of the document U.S. Publication No. 2011/0191971 which relates to a manual toothbrush comprising a brush head pivotally mounted on a handle and allowing simultaneously brushing the upper and lower teeth, this brush head being provided with a "H" shaped support defining a lower groove and an upper groove and which supports, on the one hand and inside the upper groove, upper lateral brush elements opposite each other and upper transverse brush elements and, on the other hand and inside the lower groove, lower lateral brush elements disposed opposite each other and lower transverse brush elements. Such a manual toothbrush, however, offers a reduced brushing quality.

SUMMARY

This section provides a general summary of the disclosure and is not a comprehensive disclosure of its full scope or all of its features.

The present disclosure provides a brush head for an electric toothbrush, which allow simultaneously brushing the upper and lower teeth, while being simple in design, adapted to many dentition morphologies, inexpensive to manufacture and also with a reduced size.

The present disclosure further provides a brush head which enables a joint brushing of the inner, outer and occlusal faces of both upper and lower teeth for a quick and efficient brushing.

Furthermore, the present disclosure provides a brush head which is shaped for a holding of the electric toothbrush which is ergonomic and which enables a complete brushing without having to remove the brush head from the mouth to reach the molars to the right and to the left.

Further still, the present disclosure provides a brush head which allows replacing brush elements without having to replace everything.

To this end, the present disclosure provides a brush head for an electric toothbrush, the brush head comprising:

a support comprising two lateral walls connected by a transverse wall which separates, on either side of the transverse wall, an upper groove and a lower groove, wherein these lateral walls and the transverse wall are shaped so as to support, on the one hand, and inside the upper groove, upper lateral brush elements opposite each other and upper transverse brush elements, for the joint brushing of the inner, outer and occlusal faces of the upper teeth, on the other hand, and inside the lower groove, lower lateral brush elements disposed opposite each other and lower transverse brush elements; and an oscillatory device adapted to impart an oscillatory movement to said support, wherein the support is elastically deformable to enable an arcuate deformation, and has a midplane intersecting the two lateral walls and the transverse wall such that the support is shaped so as to support upper lateral brush elements, upper transverse brush elements, lower lateral brush elements, and lower transverse brush elements on either side of said midplane, and wherein said oscillatory device comprises a movable part on which the support is mounted, and a drive shaft coupled to said movable part to drive in oscillation the movable part and the support according to an oscillatory movement comprising at least one reciprocating component in translation according to a direction orthogonal to said midplane, wherein said movable part and the drive shaft extend substantially in the midplane of the support.

In the context of the present disclosure, the support is shaped so as to enable an arcuate deformation, that is to say that the support is adapted to be elastically deformed to take on an arcuate conformation, in order to enable the support to conform to the upper and lower dental arches during the brushing, which will be performed by placing the upper dental arch within the upper groove and the lower dental arch within the lower groove, and then by making the support slide from left to right and from right to left for a brushing of all faces of the lower and upper teeth. Thus, thanks to the flexible or elastically deformable nature of the support, it is possible to propose a support which is adapted to many dentition morphologies, because the support is adapted to be deformed (that is to say to be arched) in order to conform to the upper and lower dental arches during the brushing.

In combination with the flexible nature of the support, the positioning of the movable part and the drive shaft of the oscillatory device with respect to the midplane of the support will enable an ergonomic holding of the toothbrush throughout the entire brushing, by starting from the central incisors then by going to the right up to the right molars (until the brush head abuts against the commissure of the lips to the right) and by returning to the left up to the left molars (until the brush head abuts against the commissure of the lips to the left), without having to remove the support from the mouth throughout the entire brushing and just by making the support slide on the dental arches, previously closed on the support to form "rails" for the support which slides somehow like a slider.

Therefore, the support can be reduced in size and all it needs is to make the support slide along the dental arches during the brushing, to pass from the incisors to the right then left molars. In other words, once the support is placed in the mouth, it no longer comes out of the oral cavity and the manual brushing movement will be done as a displacement along a rail (herein the two dental arches closed on the support) from left to right and from right to left.

At the beginning of the brushing, the user bites into the support by placing the upper dental arch within the upper groove and by placing the lower dental arch within the lower groove, such that the midplane of the support substantially coincides with the plane of symmetry of the user (or plane of symmetry of the face or dental arches), and then the user makes the support slide to the right then to the left (or conversely) to reach the back molars.

In use:

the upper lateral brush elements will enable the brushing of the outer faces (or vestibular faces) and the inner faces (or palatal faces) of the upper teeth;

the lower lateral brush elements will enable the brushing of the outer faces (or vestibular faces) and the inner faces (or palatal faces) of the lower teeth;

the upper transverse brush elements will enable the brushing of the occlusal faces (or chewing faces) of the upper teeth; and the lower transverse brush elements will enable the brushing of the occlusal faces (or chewing faces) of the lower teeth.

It is quite clear, in the context of the present application, the fact that the walls of the support are "shaped so as to support" the different aforementioned brush elements, means that the walls support these brush elements and/or the walls provide for supporting the brush elements, these brush elements may be absent since they are detachable or removable. In other words, the present disclosure cannot be limited to walls supporting brush elements, that is to say that the brush head may be proposed with the brush elements (these brush elements being for example integrated into the walls of the support, or securely fastened on the walls of the support), or alternatively be proposed without the brush elements (these brush elements then being removable or detachable and adapted to cooperate with the walls of the support).

According to the present disclosure, the movable part and the drive shaft when coupled and positioned substantially in the midplane, will allow imparting to the support with an efficient oscillatory movement, with at least one reciprocating component in translation according to a direction orthogonal to the midplane, for a joint brushing of the inner, outer and occlusal faces of the lower and upper teeth; the component of the oscillatory movement constituting a vibrational movement which actively contributes to the efficiency of the brushing.

In the context of the present disclosure, the feature according to which the drive shaft is coupled to the movable part to drive in oscillation the movable part and the support in an oscillatory movement comprising at least one reciprocating component in translation according to a direction orthogonal to said midplane, means that the coupling between the drive shaft and the movable part provides in use a conversion of a movement of the drive shaft into an oscillatory movement incorporating a reciprocating component as described above, yet without the present disclosure being limited to a specific coupling, in other words to a specific movement conversion between the drive shaft and the movable part.

In the context of the present disclosure, the feature according to which "the movable part and the drive shaft extend substantially in the midplane of the support" means that the movable part and the drive shaft are elongate parts extending according to respective longitudinal directions which are included in the midplane of the support with an angular freedom of ±10 degrees with respect to the midplane, or even ±5 degrees with respect to the midplane. In other words, the midplane substantially cuts the movable part and the drive shaft along their respective lengths.

The positioning of the movable part and the drive shaft with respect to the midplane of the support, will allow for an ergonomic holding of the handle of the electric toothbrush. Indeed, when in place, the handle which is parallel, or even substantially collinear, to the drive shaft, will extend in the midplane of the support, the midplane being substantially coplanar with the plane of symmetry of the face at the beginning of the brushing (support at the level of the central incisors), such that the handle is held substantially like holding an ice cream cone or a microphone, providing a particularly ergonomic and non-traumatic holding for the arm and shoulder throughout the entire brushing; a duration of the brushing is also considerably shortened thanks to the multiplicity of brush elements and thanks to the sliding brushing movement from right to left and from left to right.

According to one variant, the midplane is a plane of symmetry of the support.

In general, when the brush elements are in place on the support, upper lateral brush elements, upper transverse brush elements, lower lateral brush elements and lower transverse brush elements are disposed on either side of the midplane, meaning that:

a portion of the upper lateral brush elements, the upper transverse brush elements, the lower lateral brush elements and the lower transverse brush elements is disposed on the right of the midplane; and another portion of the upper lateral brush elements, the upper transverse brush elements, the lower lateral brush elements and the lower transverse brush elements is disposed on the left of the midplane.

It should also be noted that the support is elastically deformable to enable an arcuate deformation on either side of the midplane, and in particular a symmetrical arcuate deformation with respect to the midplane.

According to one feature, the support is elastically deformable by being made at least partially of an elastically deformable flexible material.

Alternatively, the support is elastically deformable by being made in the form of a framework or skeleton adapted to be elastically deformed.

In one particular form, the support is integrally made of an elastically deformable flexible material.

Advantageously, the support is made integrally in one piece of an elastically deformable flexible material.

According to one possibility, the elastically deformable flexible material is of the plastic material, polymer material or elastomeric material type.

According to another possibility, the elastically deformable flexible material is a silicone elastomer, an isobutylene-isoprene elastomer, a synthetic or natural rubber, a polyacrylic elastomer.

According to another possibility, the support is made by molding.

In a particular form, at least one amongst the lateral walls of the support has at least one furrow forming a folding primer or at least one notch to promote an arcuate deformation, which has the advantage of promoting the flexibility of the support to conform to the upper and lower dental arches during the brushing.

According to one possibility, the support has several furrows or several notches, contributing to increasing the flexibility of the support to conform to the dental arches when in place.

According to one variant, the or each furrow is formed on an outer face and/or on an inner face of at least one lateral wall.

According to one variant, the or each furrow extends parallel to a vertical direction orthogonal to the main (or extension) directions of the grooves described hereinbefore; said main directions of the grooves being orthogonal to the midplane.

According to one possibility, the lateral walls and the transverse wall are made of an elastically deformable flexible material.

According to another possibility, the transverse wall has through apertures shaped so as to receive transverse brush elements having upper brushes forming the upper transverse brush elements, and opposite lower brushes forming the lower transverse brush elements.

In this form, the apertures form removable fasteners adapted for a removable fastening of the transverse brush elements on the transverse wall, but it should be noted that other forms of removable fasteners may be considered without departing from the present disclosure.

In accordance with another advantageous feature of the present disclosure, the upper groove and the lower groove are rectilinear grooves bordered by substantially parallel and planar lateral walls.

As previously explained, with such a support, it is not desired to have arcuate grooves which contribute to increasing the dimensions, although such arcuate shapes remain possible, in particular for infantile dentitions.

Thus, according to one variant, the upper groove and the lower groove are curved grooves bordered by curved lateral walls.

In other words, the present disclosure cannot be limited to substantially parallel and planar lateral walls, but more generally include lateral walls opposite each other to delimit, with the transverse wall, a lower groove and an upper groove.

In a particular form, at least one amongst the lateral walls and the transverse wall has through apertures shaped so as to receive by nesting, brush elements.

Thus, the brush elements can be removed and replaced, one by one, without having to replace the support and the other elements of the brush head. In this form, the apertures form removable fasteners adapted for a removable fastening of the brush elements on the wall(s) of the support, but it should be noted that other forms of removable fasteners could be considered without departing from the present disclosure.

According to one variant, the two lateral walls and the transverse wall have such through apertures.

According to a possibility of the present disclosure, each aperture has an inner border in which at least one protruding lug, or conversely at least one slot, is provided such that each brush element can be nested into an aperture by a cooperation of a lug in a slot.

Such apertures are adapted to the case where each brush element comprises a base provided with an outer contour in which at least one slot, or conversely at least one protruding lug, is provided such that each brush element is nested into an aperture by cooperation of the lug in the slot.

According to another possibility of the present disclosure, the apertures are provided in elastically deformable flexible walls, which allows forcibly mounting the brush elements with an efficient and durable mechanical holding.

According to another possibility, each aperture has, on its inner border, a rigid reinforcement frame or insert in which the protruding lug or the slot is provided.

Thus, it may be considered the possibility of positioning rigid frames or inserts which are placed in the apertures (for example by an overmolding or by a bi-injection molding) and which receive the brush elements in order to reinforce their anchorages and to inhibit them from disengaging according to the flexibility of the support.

According to one possibility, the oscillatory movement comprises only the reciprocating component in translation according to a direction orthogonal to the midplane of the support (and therefore incidentally substantially parallel to the directions of extension of the two lower and upper grooves).

According to one feature, the movable part of the oscillatory device is a rigid part.

According to one variant, the movable part of the oscillatory device extends according to a direction orthogonal to the lateral walls.

According to another feature, the movable part of the oscillatory device extends at the level of the transverse wall of the support, therefore substantially at the level of the junction between the upper dental arch and the lower dental arch in the brushing situation, contributing to an easy handling by the user.

According to another feature, the movable part of the oscillatory device has a mounting portion which passes through the support in its lateral wall, the mounting portion having a central portion extending in the lateral wall and which has an upper face facing the upper groove and a lower face facing the lower groove.

The mounting portion is thus placed in the core, or the center, of the support, to improve the transmission of the oscillatory movement to the entire support.

According to one possibility, the upper face and the lower face of the central portion of the mounting portion of the movable part support brushes forming respectively an upper transverse brush element and a lower transverse brush element; such brushes extending, where appropriate, respectively inside the upper groove and the lower groove.

According to one feature, the mounting portion of the movable part is nested into two mounting through orifices formed opposite each other in the respective lateral walls of the support.

According to one variant, the mounting portion of the movable part is embedded within the support.

In a particular form, the mounting portion of the movable part has two opposite end portions which are embedded within the respective lateral walls, or each end portion has:

an upper face facing the upper groove, said upper face supporting a brush forming an upper lateral brush element which passes through the corresponding lateral wall to open into the upper groove; and a lower face facing the lower groove, said lower face supporting a brush forming a lower lateral brush element which passes through the corresponding lateral wall to open into the lower groove.

Advantageously, two rigid inner parts are embedded within the support, where each inner part is rigidly coupled to the mounting portion of the movable part on either side of the movable part, where each inner part comprises a central portion which is embedded within the transverse wall and which has:

an upper face facing the upper groove, said upper face supporting a brush forming an upper transverse brush element which passes through the transverse wall to open into the upper groove; and an opposite lower face facing the lower groove, said lower face supporting a brush forming a lower transverse brush element which passes through the transverse wall to open into the lower groove.

Such inner parts are advantageous for transmitting the oscillatory movement throughout the entire support, and therefore throughout all brush elements. Moreover, the rigid coupling between the mounting portion of the movable part and the two inner parts is shaped so as to enable an arcuate deformation of the support to take on an arcuate conformation and thus to conform to the dental arches. The rigidity of the coupling is intended for a proper transmission of the oscillatory movement of the movable part towards the two inner parts.

Still advantageously, each inner part comprises two opposite end portions which are embedded within the respective lateral walls, where each end portion has:

an upper face facing the upper groove, said upper face supporting a brush forming an upper lateral brush element which passes through the corresponding lateral wall to open into the upper groove; and a lower face facing the lower groove, said lower face supporting a brush forming a lower lateral brush element which passes through the corresponding lateral wall to open into the lower groove.

According to another possibility, the movable part has a coupling portion coupled to the drive shaft via coupling elements for converting a rotation of the drive shaft into a reciprocating oscillation of the movable part and the support.

In a particular form, the coupling elements comprise an oblong slit formed in the coupling portion, and an eccentric cam provided on an upper end of the drive shaft, with the eccentric cam which is engaged into the oblong slit, so that a rotation of the drive shaft is converted into a reciprocating oscillation of the movable part and the support.

The transmission of the rotation of the drive shaft in a reciprocating oscillatory movement is thus a cam-follower type transmission, the follower being the coupling portion with its oblong slit.

However, and as previously mentioned, the present disclosure cannot be limited to such a cam-follower coupling, and other types of coupling may be considered between the drive shaft and the movable part to convert a movement of the drive shaft (and in particular, but without limitation, to a rotary movement of the drive shaft) into an oscillatory movement of the movable part integrating a reciprocating component as previously described.

In one advantageous form, the coupling portion is fitted in a case in which two opposite guide holes are provided, and the coupling portion comprises two guide pins engaged into these guide holes, for guiding the movable part according to the reciprocating movement.

In a particular form, the brush head further comprises a main sleeve surrounding at least partially the drive shaft and on which the movable part is mounted, the main sleeve being intended to be removably mounted on a handle housing an electric motor coupled to an output shaft adapted for coupling with the drive shaft.

In a particular form, the brush head further comprises upper lateral brush elements and lower lateral brush elements supported by the lateral walls of the support, as well as upper transverse brush elements and lower transverse brush elements supported by the transverse wall of the support.

Indeed, these brush elements may be permanently fastened on the support, or else they may be removably or detachably fastened on the support such that, in this second scenario with removable brush elements, it is possible to have a supply of the support without the brush elements mounted thereon.

The present disclosure also relates to an electric toothbrush, comprising a handle housing an electric motor coupled to an output shaft, and a brush head in accordance with the present disclosure, where the drive shaft of the oscillatory device of the brush head is coupled, on the one hand, to the movable part to drive in oscillation the movable part and the support and, on the other hand, to the output shaft, and where the oscillatory device is carried by the main sleeve removably mounted on an upper end of the handle.

The present disclosure also concerns a brush kit comprising at least one brush element adapted to be nested into a through aperture provided for the previously described brush head.

According to one variant, the brush kit comprises several brush elements adapted to be nested into the through apertures provided for the brush head.

According to one variant, the brush kit comprises as many brush elements as there are through apertures provided for the brush head, each brush element being adapted for a dedicated aperture.

According to one possibility, each brush element comprises a base provided with a peripheral contour in which at least one slot, or conversely at least one protruding lug, is provided, such that each brush element can be nested into an aperture by a cooperation of a lug in a slot.

Advantageously, the bases of the brush elements are rigid, for an improved mechanical holding in the apertures.

According to one possibility, the brush kit comprises at least one transverse brush element comprising a base having an upper face supporting an upper brush and a lower face, opposite to the upper face, and supporting a lower brush.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 2 is a partial rear perspective view of the first toothbrush of FIG. 1;

FIG. 3 is a partial side view of the first toothbrush of FIGS. 1 and 2;

FIG. 5 is an exploded front perspective view of the first brush head of FIGS. 1 to 3, without the brush elements;

FIG. 14 is a partial side view of the second toothbrush of FIG. 13;

FIG. 15 is a front view of the second brush head of FIGS. 13 and 14;

Figure 1:
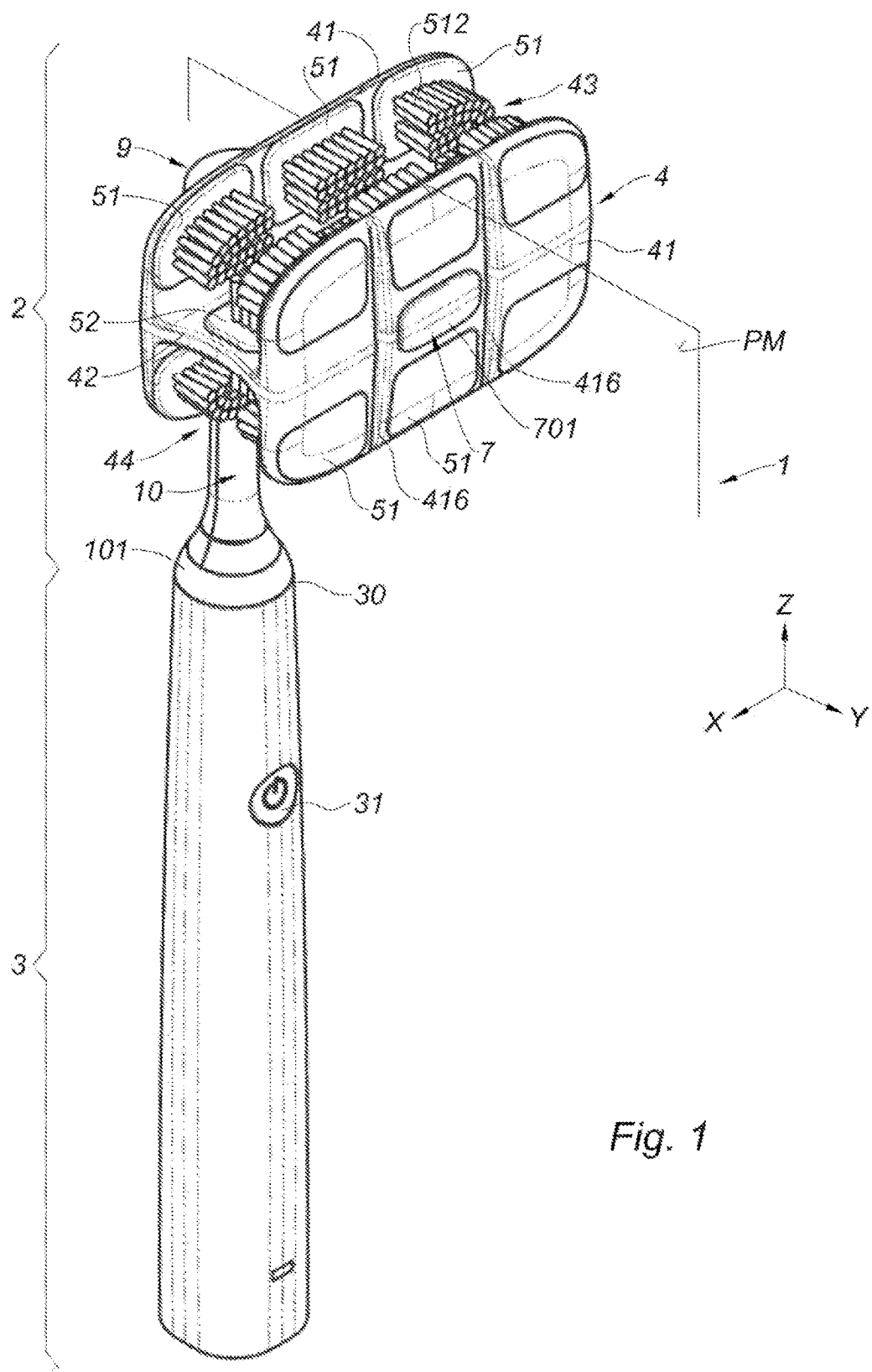
FIG. 1 is a front perspective view of a first toothbrush equipped with a first brush head in accordance with a first form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The following detailed description relates to a first electric toothbrush 1 according to the present disclosure, and to a second electric toothbrush 100 according to the present disclosure, where these two electric toothbrushes 1, 100 are presented and described as illustrative and non-limiting examples of the present disclosure. In the following description, and in all figures, identical or similar references refer to identical or similar members, set of members, functional members or structural members.

The following description relates to the first electric toothbrush 1, with reference to FIGS. 1 to 7.

Referring to FIGS. 1 to 3, the first electric toothbrush 1 according to the present disclosure comprises a first brush head 2 and a handle 3 housing an electric motor coupled to an output shaft which protrudes from an upper end 30 of the handle 3; a switch 31 being provided on the handle 3 to enable the start/stop of the electric motor.

The first brush head 2 is mechanically coupled on the upper end 30, in particular by clipping or snap-fitting.

The first brush head 2 comprises a support 4 made integrally and in one piece of an elastically deformable flexible material, such as an elastomeric material.

The support 4 has two parallel lateral walls 41 and a transverse wall 42 connecting at mid-height the two lateral walls 41 such that the lateral walls 41 and the transverse wall 42 delimit, on either side of the transverse wall 42, an upper groove 43 and a lower groove 44.

Thus, the upper groove 43 and the lower groove 44 are opposite, to the extent that the upper groove 43 is open at the top whereas the lower groove 44 is open at the bottom and where these two grooves 43, 44 are disposed on either side of the transverse wall 42 which separates them.

The lateral walls 41 extend parallel to a plane (X, Z) defined by a longitudinal direction X and by a vertical direction Z orthogonal to the longitudinal direction X. The lateral walls 41 are substantially rectangular, with a length L according to the longitudinal direction X and a height H according to the vertical direction Z, where the length L is larger than the height H. As a non-limiting example, the length L is comprised between 3 and 7 centimeters, and the height H is comprised between 2 and 5 centimeters.

The upper groove 43 is delimited by the portions of the lateral walls 41 located above the transverse wall 42 and also by the transverse wall 42 which forms the bottom, and the lower groove 44 is delimited by the portions of the lateral walls 41 located below the transverse wall 42 and by the transverse wall 42 which forms the bottom.

Thus, the support 4 has a generally "H-shaped" cross-section, according to a midplane PM parallel to a plane (Y, Z), where the transverse direction Y is orthogonal to both the longitudinal direction X and the vertical direction Z. Moreover, the midplane PM forms a first plane of symmetry of the support 4.

The support 4 has a second symmetry with respect to a second plane of symmetry parallel to the plane (X, Z) and to the lateral walls 41, the second plane of symmetry intersecting the transverse wall 42.

Finally, the support 4 has a third symmetry with respect to a third plane of symmetry parallel to the plane (X, Y) and orthogonal to the lateral walls 41, the third plane of symmetry being coplanar with the transverse wall 42.

The lateral walls 41 are substantially parallel to the plane (X, Z) and are substantially planar, and the transverse wall 42 is orthogonal to the lateral walls 41 and is substantially planar, and thus the upper groove 43 and the lower groove 44 are rectilinear grooves, that is to say, non-arcuate or non-curved, which extend parallel to each other according to extension directions parallel to the longitudinal direction X.

Figure 4:
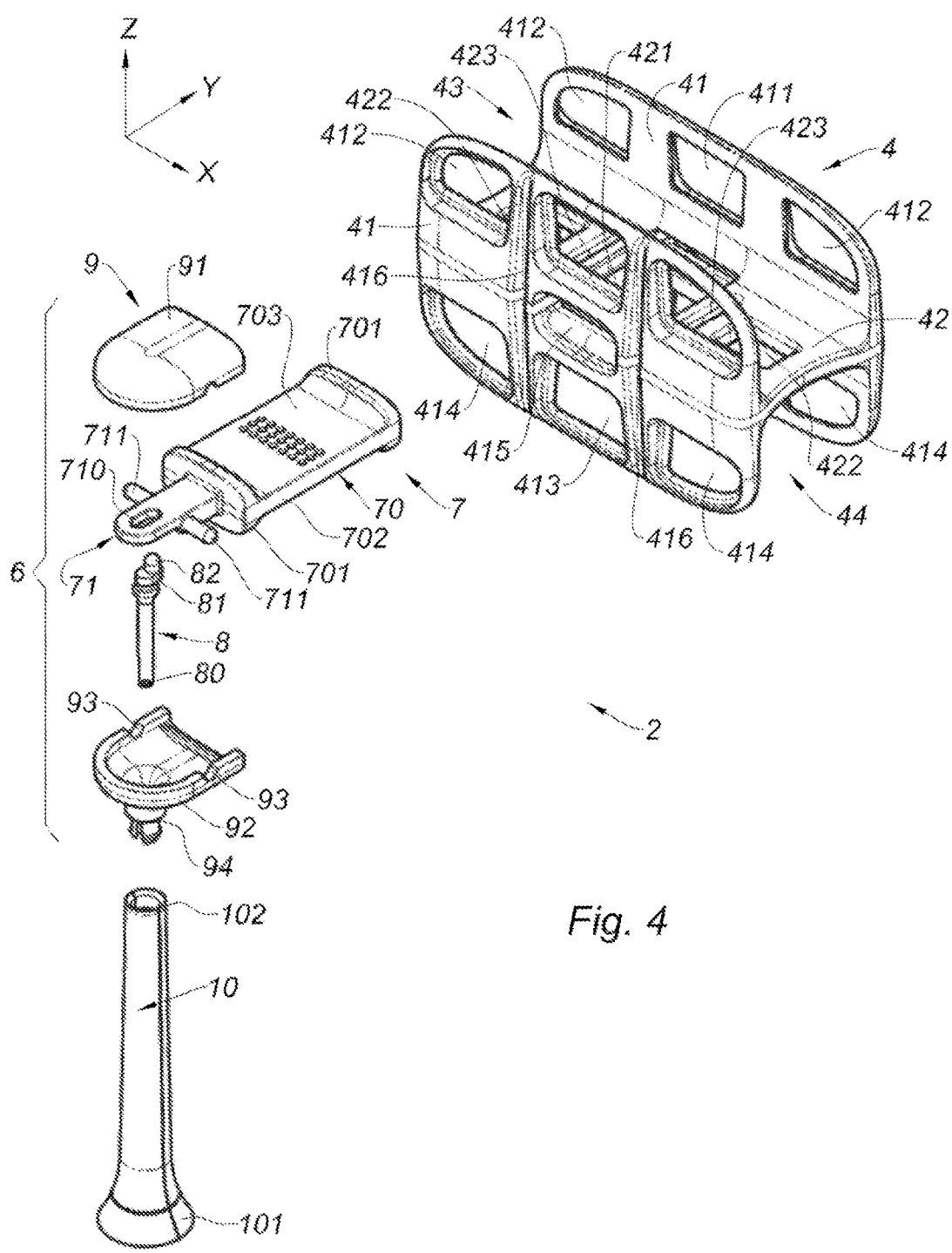
FIG. 4 is an exploded rear perspective view of the first brush head of FIGS. 1 to 3, without the brush elements.
Figure 6:
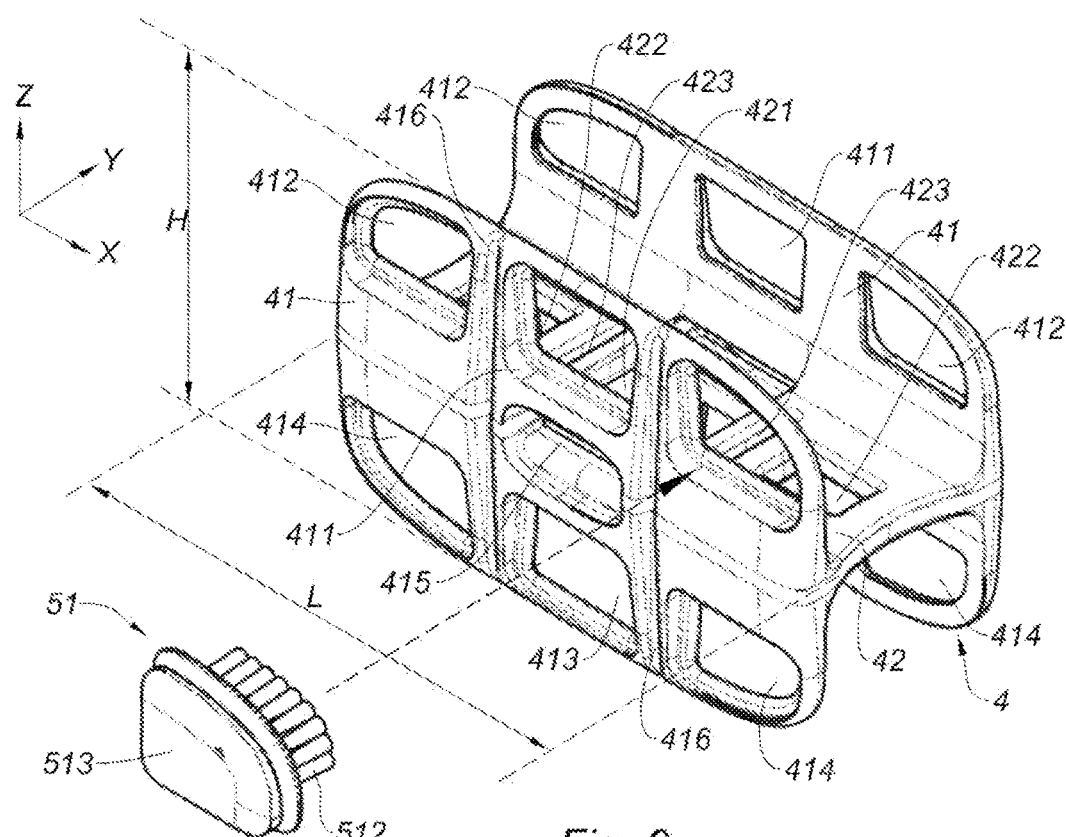
FIG. 6 is a perspective view of the support of the first brush head of FIGS. 1 to 5, with a single lateral brush element located in front of its reception aperture.
Figure 7:
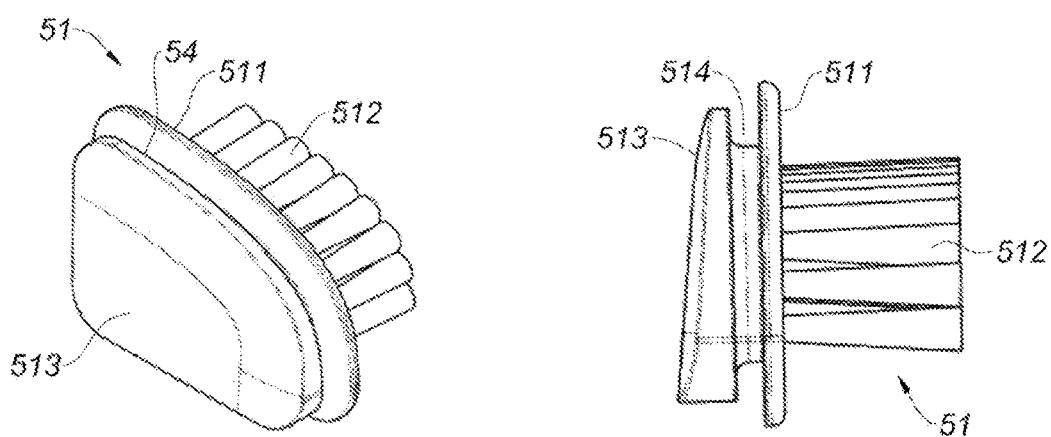
FIG. 7 is a perspective (left) rear and (right) side view of a lateral brush element.

Referring to FIGS. 4 to 6, the lateral walls 41 have apertures 411, 412, 413, 414 opposite each other, that is to say that each aperture 411, 412, 413, 414 formed on a lateral wall 41 faces, or is opposite, an aperture 411, 412, 413, 414 formed on the other lateral wall 41. Two apertures opposite each other are aligned according to a direction parallel to the transverse direction Y. Each aperture 411, 412, 413, 414 is a through aperture, that is to say it forms a hole passing through the concerned lateral wall 41 across its thickness.

Each lateral wall 41 has:

a central upper aperture 411 surrounded, according to a direction parallel to the longitudinal direction X, by two corner upper apertures 412 provided at the upper corners of the lateral wall 41, these apertures 411, 412 opening into the upper groove 43; and a central lower aperture 413 surrounded, according to a direction parallel to the longitudinal direction X, by two corner lower apertures 414 provided at the lower corners of the lateral wall 41, these apertures 413, 414 opening into the lower groove 44.

On the right, the corner upper aperture 412 and the corner lower aperture 413 are aligned according to a direction parallel to the vertical direction Z, at the center the central upper aperture 411 and the central lower aperture 413 are aligned according to a direction parallel to the vertical direction Z, and on the left the corner upper aperture 412 and the corner lower aperture 413 are aligned according to a direction parallel to the vertical direction Z.

The apertures 411, 412 are provided in the top portion of the lateral walls 41 along their longitudinal upper edges, whereas the apertures 413, 414 are provided in the bottom portion of the lateral walls 41 along their longitudinal lower edges.

Each lateral wall 41 also has a mounting through orifice 415 located at mid-length (at the middle according to a direction parallel to the longitudinal direction X) and at mid-height (at the middle according to a direction parallel to the vertical direction Z), such that the two mounting orifices 415 are disposed opposite each other, while being aligned according to a direction parallel to the transverse direction Y. These mounting orifices 415 are located at the intersection of the first midplane of symmetry and the parallel second midplane of symmetry.

These mounting orifices 415 open into the thickness of the transverse wall 42. Each mounting orifice 415 is surrounded, according to a direction parallel to the vertical direction Z, by the central upper aperture 411 and the central lower aperture 413.

Each lateral wall 41 also has two furrows 416 extending parallel to the vertical direction Z, these two furrows 416 extending on either side of the central upper aperture 411, the central lower aperture 413 and the mounting orifice 415. These furrows 416 form folding primers or lines of weakness (or of least thickness) which contribute to a better flexibility of the support 4 to conform to the dental arches when in place.

These furrows 416 may be formed on the inside of the lateral walls 41, or on the outside of the lateral walls 41, or both on the inside and the outside of the lateral walls 41.

The transverse wall 42 has three apertures 421, 422, namely a central aperture 421 surrounded, according to a direction parallel to the longitudinal direction X, by two distal apertures 422. The central aperture 421 extends between the two mounting orifices 415, according to a direction parallel to the transverse direction Y.

The transverse wall 42 also has two oblong and through slits 423, extending parallel to the transverse direction Y, and which are disposed on either side of the central aperture 421, between the central aperture 421 and the distal apertures 422. These slits 423 will remain empty or unoccupied and will serve to promote the deformation of the lateral walls 41 which will conform to the arcuate shapes of the upper and lower dental arches.

The first brush head 2 also comprises brush elements 51, 52 which are supported by the support 4 and which extend inside the upper groove 43 and the lower groove 44 for the joint brushing of the upper teeth and the lower teeth.

The brush elements 51, 52 comprise lateral brush elements 51 which are supported by the lateral walls 41, and transverse brush elements 52 which are supported by the transverse wall 42. The brush elements 51, 52 are removably mounted, such that they can be removed and replaced where desired manually and without tools.

The lateral brush elements 51 are nested into the apertures 411, 412, 413, 414 provided in the lateral walls 41. As such, each lateral brush element 51 comprises a base 510 having an inner face 511 supporting a brush 512 (FIG. 7) composed of brushing bristles, an outer face 513 opposite to the inner face 511 and a peripheral contour 10 in which a slot 514 is provided over the entire contour. The base 510 may be rigid, in particular by being made of a thermoplastic material such as polypropylene.

Each aperture 411, 412, 413, 414 has an inner border in which a protruding lug is provided over its entire contour, such that each lateral brush element 51 is nested into an aperture 411, 412, 413, 414 by cooperation of the lug in the slot 514 (or male/female cooperation), that is to say with the lug engaged inside the groove 514 of the lateral brush element 51. With the elasticity or flexibility of each lateral wall 41, each lateral brush element 51 is forcibly mounted in the corresponding aperture 411, 412, 413, 414 until the lug is engaged within the slot 514, thus blocking the lateral brush element 51 in the aperture.

Once the lateral brush element 51 is blocked in its aperture, the brush 512 extends into the concerned groove 43, 44, and the outer face 513 extends on the outside of the support 4.

Thus, once the lateral brush elements 51 are in place on the support 4, a distinction should be made between:

upper lateral brush elements 51 which are disposed opposite each other in the upper apertures 411, 412 and which are provided for the joint brushing of the inner and outer faces of the upper teeth; and lower lateral brush elements 51 which are disposed opposite each other in the lower apertures 413, 414 and which are provided for the joint brushing of the inner and outer faces of the lower teeth.

The transverse brush elements 52 are nested into the distal apertures 422 provided in the transverse wall 42. As such, each transverse brush element 51 comprises a base 520 having an upper face supporting an upper brush 523 composed of brushing bristles, a lower face opposite to the upper face and supporting a lower brush 524 composed of brushing bristles and a peripheral contour in which a slot is provided over the entire contour. The base 520 may be rigid, in particular by being made of a thermoplastic material such as polypropylene.

Each distal aperture 422 has an inner border in which a protruding lug is provided over its entire contour, such that each transverse brush element 52 is nested into a distal aperture 422 by cooperation of the lug in the slot (or male/female cooperation), that is to say with the lug engaged within the groove of the transverse brush element 52. With the elasticity or flexibility of the transverse wall 42, each transverse brush element 52 is forcibly mounted in the corresponding distal aperture 422 until the lug is engaged within the slot, thereby blocking the transverse brush member 52 in the window.

Once the transverse brush element 52 is blocked in its aperture, the upper brush 523 extends into the upper groove 43 and the lower brush 524 extends into the lower groove 44.

Thus, once the transverse brush elements 52 are in place on the support 4, a distinction should be made between:

the upper brushes 523 (or upper transverse brush elements 523) which are provided for the joint brushing of the occlusal faces of the upper teeth; and the lower brushes 524 (or lower transverse brush elements 524) which are provided for the joint brushing of the occlusal faces of the lower teeth.

The first brush head 2 further comprises an oscillatory device 6 adapted to impart an oscillatory movement to the support 4, and in particular a reciprocating oscillatory movement according to a direction parallel to the transverse direction Y, where the oscillatory device 6 is carried by a main sleeve 10 intended to be removably mounted on the upper end 30 of the handle 3.

The oscillatory device 6 comprises:
a rigid movable part 7 on which the support 4 is mounted;
a drive shaft 8 coupled to the movable part 7 to drive in oscillation the movable part 7 and the support 4; and
a case 9.

The movable part 7 is an oblong part extending according to a longitudinal direction parallel to the transverse direction Y and included in the midplane PM (or first plane of symmetry) of the support 4 and it has a mounting portion 70 which passes through the support 4 and which is nested into the two mounting orifices 415 formed opposite each other in the two lateral walls 41.

The mounting portion 70 has:
two opposite end portions 701 forming protrusions which are nested into the respective mounting orifices 415; and
between the two end portions 701 (therefore between the two mounting orifices 415 when in place), a central portion 702 extending inside the central aperture 421 provided in the transverse wall 42.

The central portion 702 thus has an upper face 703 facing the upper groove 43 and a lower face 704 facing the lower groove 44. The upper face 703 supports a brush (not illustrated in FIG. 4 where only the mounting holes of the brush bristles are shown on the upper face 703) which will form an upper transverse brush element 523, and similarly the lower face 704 supports a brush (not illustrated in FIG. 5 where only the mounting holes of the brush bristles are shown on the lower face 704) which will form a lower transverse brush element 524.

With the elasticity or flexibility of each lateral wall 41, the mounting portion 70 is forcibly mounted in the two mounting orifices 415 until the end portions 701 are blocked in these mounting orifices 415.

The movable part 7 has, in the extension of one of the end portions 701 of the mounting portion 70, a coupling portion 71 in which an oblong slit 710 is formed extending according to a direction parallel to the transverse direction Y. The coupling portion 71 also has, on either side of the oblong slit 710, two guide pins 711 extending according to a direction parallel to the longitudinal direction X.

The movable part 7 is made integrally in one piece of a rigid material, such as a metal or plastic material.

The drive shaft 8 is rotatable about an axis of rotation parallel to the vertical direction Z and included in the midplane PM of the support 4, in other words the drive shaft 8 has a longitudinal direction parallel to the vertical direction Z and included in the midplane PM of the support 4. Thus, the axis of rotation of the drive shaft 8 and the longitudinal direction of the movable part 7 are perpendicular.

The drive shaft 8 has a lower end 80 adapted to be coupled to the output shaft which protrudes from the upper end 30 of the handle 3.

The drive shaft 8 has an upper end 81 provided with an eccentric cam 82, that is to say eccentric with respect to the axis of rotation. The eccentric cam 82 is engaged into the oblong slit 710 of the coupling portion 71 of the movable part 7, so that a rotation of the drive shaft 8 is converted into a reciprocating oscillation, according to a direction parallel to the transverse direction Y, of the movable part 7 and thus of the support 4.

The case 9 internally sets the coupling portion 71 of the movable part 7 and a portion of the drive shaft 8 which passes through the case 9.

The case 9 comprises two rigid half-shells 91, 92 which are fastened to each other, for example by snap-fitting or gluing or welding, including an upper half-shell 91 and a lower half-shell 92.

The upper half-shell 91 is put atop the coupling portion 71 of the movable part 7 and thus forms a solid cap. In turn, the lower half-shell 92 is crossed by the drive shaft 8, and to this end has a central passage for the drive shaft 8. The lower half-shell 92 has a cylindrical endpiece 94, crossed by the drive shaft 8, and which is provided with a fastening element for a fastening on the main sleeve 10. In the illustrated example, the cylindrical endpiece 94 is provided with a snap-fitting fastening element, with notched flexible legs adapted to be snap-fitted onto the main sleeve 10.

The two half-shells 91, 92 have, on their contiguous edges, semi-cylindrical notches such that, once the half-shells 91, 92 are assembled, the case 9 has two guide holes 93 into which the respective guide pins 711 are inserted, such that these guide pins 711 are slidably guided in these guide holes 93.

The main sleeve 10 comprises a lower end 101 intended to be removably (or detachably) fastened on the upper end 30 of the handle 3, for example with a snap-fitting fastening or a quarter-turn fastening. The main sleeve 10 also comprises an upper end 102 on which the cylindrical endpiece 94 of the case 9 is fastened.

The main sleeve 10 surrounds the upper portion of the output shaft which protrudes from the upper end 30 of the handle 3, as well as the lower portion of the drive shaft 8 which protrudes from the cylindrical endpiece 94. The handle 3 extends parallel to the drive shaft 8 (and therefore parallel to the vertical direction Z) such that the handle 3 is perpendicular to the longitudinal direction of the movable part 7.

The following the description relates to the use of the first toothbrush 1, with reference to FIGS. 8 to 12.

Figure 8:
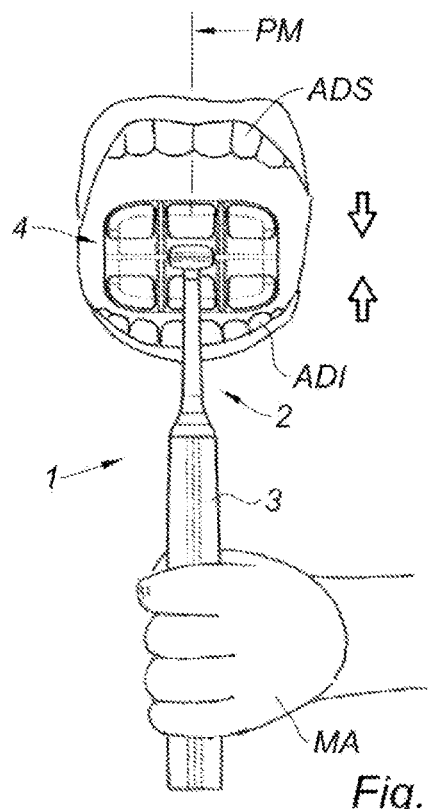
FIG. 8 is a partial front view of a user (only the users mouth and a hand being illustrated) holding a first toothbrush according to the present disclosure, at the beginning of brushing at the time of the introduction of the support into the mouth before closing the dental arches on the support.

As illustrated in FIG. 8, before brushing, the user opens the mouth to insert the support 4 inside the mouth, substantially at the center, so as to place the lower and upper incisors, and possibly the lower and upper canines according to the length L of the support 4, opposite the lower and upper grooves of the support 4.

Figure 9:
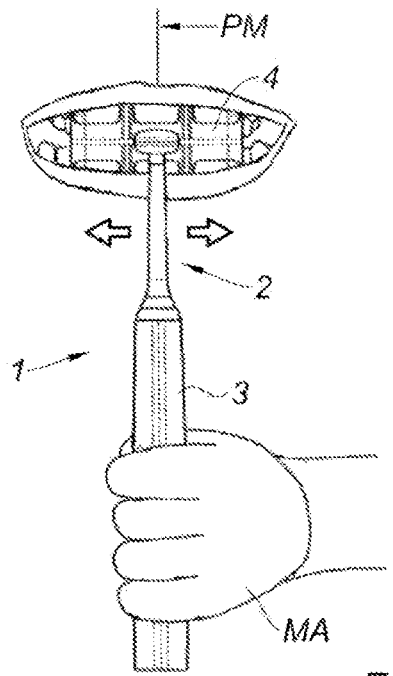
FIG. 9 is a partial front view of a user (only the users mouth and a hand being illustrated) holding a first toothbrush according to the present disclosure, at the beginning of the brushing at the time of the introduction of the support into the mouth after closing the dental arches in the lower and upper grooves of the support.

As illustrated in FIG. 9, the user then closes the mouth to place the lower and upper incisors, and possibly the lower and upper canines, inside the lower and upper grooves of the support 4. Thus, at the beginning of the brushing (and throughout the entire brushing), the longitudinal direction of the movable part 7 is substantially horizontal (provided that the user stands upright).

Figure 10:
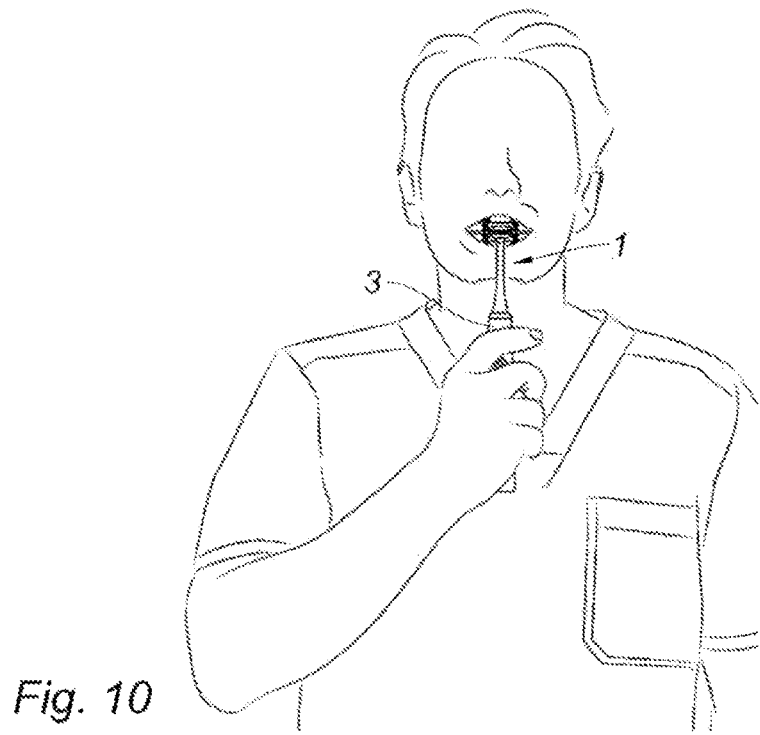
FIG. 10 is a partial front view of a user (the upper body, the head and a complete arm being illustrated) holding a first toothbrush according to the present disclosure, during the brushing of the incisors.
Figure 12:
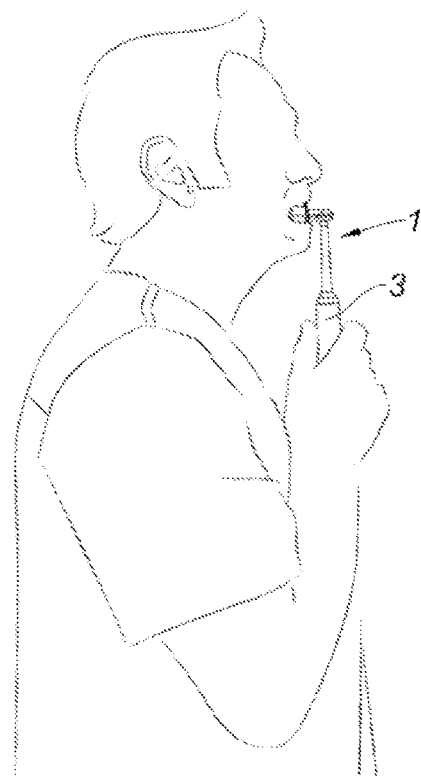
FIG. 12 is a side view of a user (the upper body, the head and a complete arm being illustrated) holding a first toothbrush according to the present disclosure, during the brushing of the incisors.

As shown in FIGS. 10 and 12, at the beginning of the brushing, the handle 3 is close to the vertical (because perpendicular to the longitudinal direction of the movable part 7), all being included in the plane of symmetry of the face, which allows limiting the pronation of the forearm which could lead to shoulder impingement pathologies. Indeed, thanks to this holding which is possible with the brush head 2 according to the present disclosure, the forearm is placed in pronation-supination, such that the capsular tension of the shoulder is limited and the shoulder impingement is thus avoided, thus offering an ergonomic holding.

Figure 11:
FIG. 11 is a partial front view of a user (the upper body, the head and a complete arm being illustrated) holding a first toothbrush according to the present disclosure, during the brushing of the back molars to the left.

Afterwards, and as shown in FIG. 11, the user will go to the right up to the right molars then return to the left up to the left molars, without having to remove the support 4 from the mouth throughout the entire brushing and just by making the support 4 slide on the upper and lower dental arches closed on the support 4 which has only to be guided by the user, who continues to hold the handle 3 close to the vertical.

The following description relates to the second electric toothbrush 100, with reference to FIGS. 13 to 17.

Figure 13:
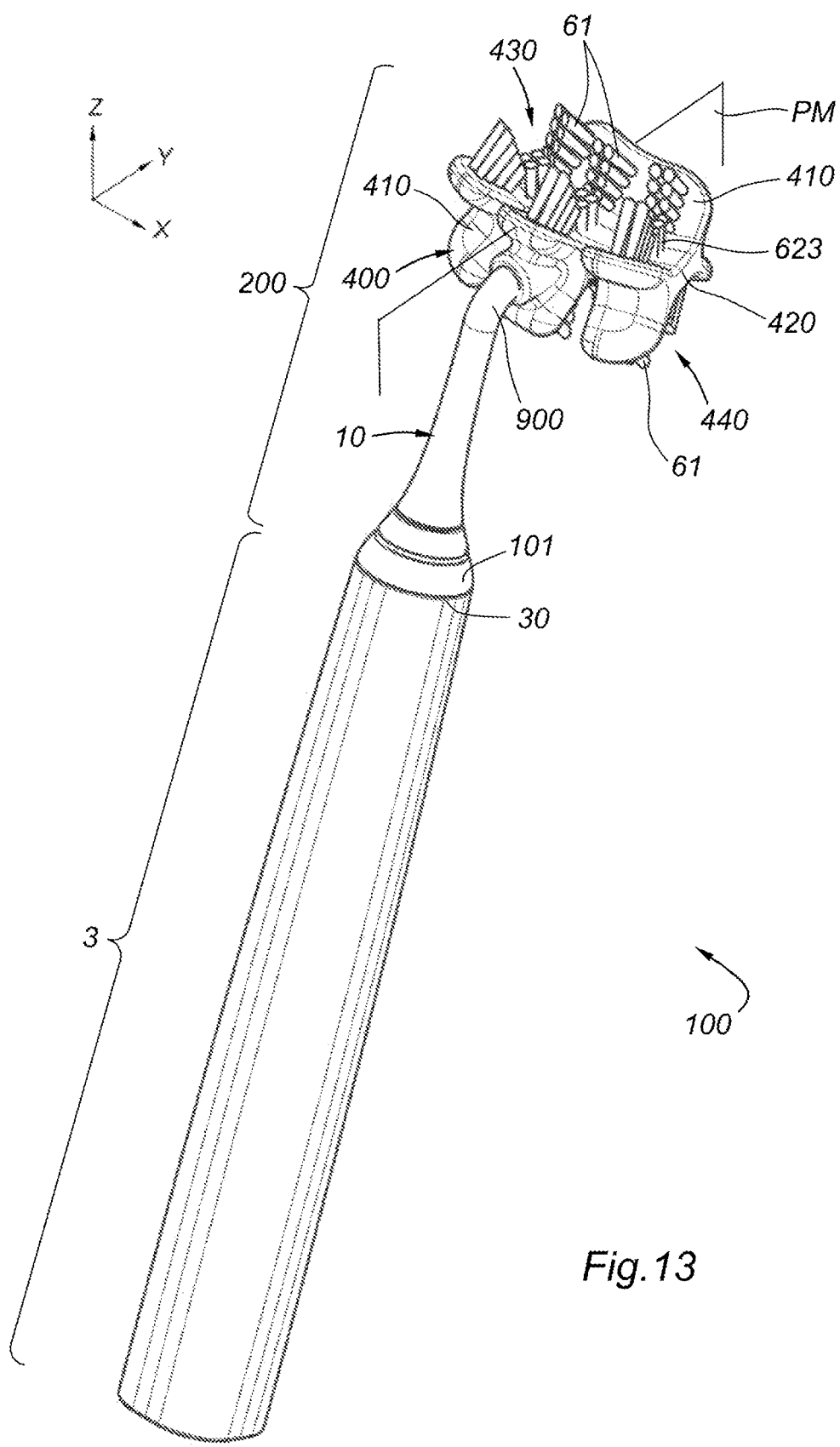
FIG. 13 is a rear perspective view of a second toothbrush equipped with a brush head in accordance with a second form of the present disclosure.

Referring to FIGS. 13 and 14, the second electric toothbrush 100 according to the present disclosure comprises a second brush head 200 and a handle 3 housing an electric motor coupled to an output shaft which protrudes from an upper end 30 of the handle 3. The handle 3 being similar to that previously described for the first electric toothbrush 1.

The second brush head 200 is mechanically coupled on the upper end 30, in particular by clipping or snap-fitting.

The second brush head 200 comprises a support 400 made integrally and in one piece of an elastically deformable flexible material, such as an elastomeric material.

The support 400 has two lateral walls 410 opposite each other and a transverse wall 420 connecting at mid-height the two lateral walls 410 such that the lateral walls 410 and the transverse wall 420 delimit, on either side of the transverse wall 42, an upper groove 430 and a lower groove 440.

Thus, the upper groove 430 and the lower groove 440 are opposite, to the extent that the upper groove 430 is open at the top whereas the lower groove 440 is open at the bottom and where these two grooves 420, 430 are disposed on either side of the transverse wall 420 which separates them.

Unlike the support 4 of the first brush head 2, the support 400 of the second brush head 200 has lateral walls 410 each having a first curvature such that, in a cutting plane corresponding to the midplane PM (already described for the first brush head 2), each lateral wall 410 has a curved, or "C"-shaped, section.

More specifically, each lateral wall 410 has an inner face (facing the inside of the support 400 on the side of the grooves 430, 440) which is convex in the midplane PM, and an outer face (facing the outside of the support 400 opposite to the grooves 430, 440) which is concave in the midplane PM.

Moreover, the lateral wall 410 located on the side of the handle 3, or the main sleeve 10 (hereinafter referred to as the proximal lateral wall 410) has notches 417, 418, shown in FIG. 17, which will contribute to a better flexibility of the support 400 to conform to the dental arches when in place. These notches 417, 418 extend substantially along the height of the proximal lateral wall 410, starting from a ridge of the proximal lateral wall 410 and by extending substantially up to the transverse wall 420.

More specifically, the proximal lateral wall 410 has two upper notches 417 at the level of the upper groove 430, and two lower notches 418 at the level of the lower groove 440. Moreover, an upper notch 417 and a lower notch 418 are disposed in alignment on one side of the midplane PM, whereas the other upper notch 417 and the other lower notch 418 are disposed in alignment on the other side of the midplane PM.

Thus, the support 400 has a generally "H"-shaped cross-section, according to a midplane PM parallel to a plane (Y, Z), by considering the transverse direction Y, the longitudinal direction X and the vertical direction Z as previously described for the first brush head 2. Moreover, the midplane PM forms a first plane of symmetry of the support 400.

Unlike the support 4 of the first brush head 2, the support 400 of the second brush head 200 does not have a symmetry with respect to a plane parallel to the plane (X, Z), to the extent that the other lateral wall 410 (the one that is farthest from the handle 3 or the main sleeve 10, and which is hereinafter referred to as the distal lateral wall 41 does not have any notches.

On the contrary, the support 400 also has a symmetry with respect to a plane of symmetry parallel to the plane (X, Y) coplanar with the transverse wall 420.

Figure 16:
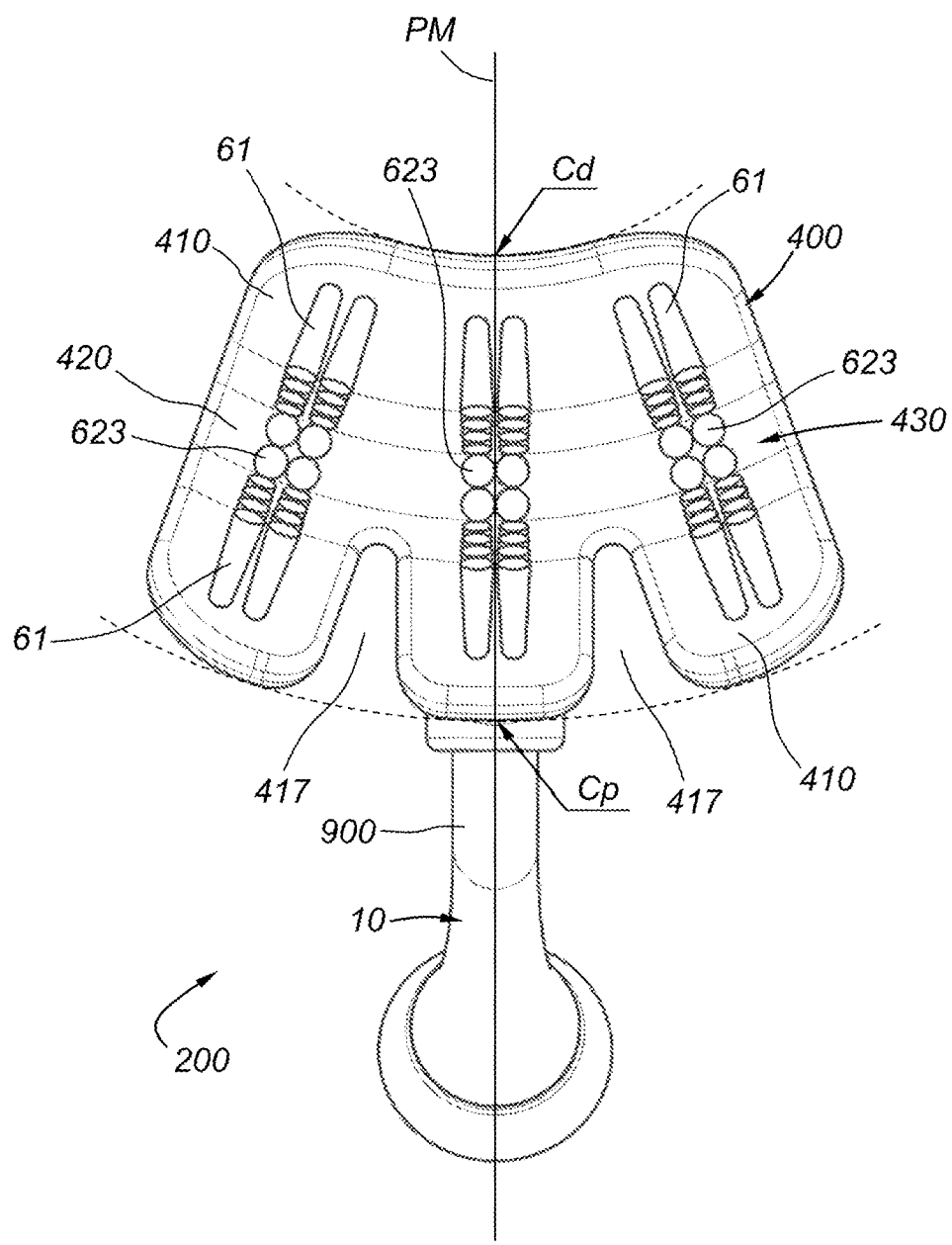
FIG. 16 is a top view of the second brush head of FIGS. 13 to 15.

Still unlike the support 4 of the first brush head 2, each of the lateral walls 410 of the support 400 of the second brush head 200 has a second curvature such that, in a cutting plane parallel to the plane (X, Y) or to the transverse wall 420, each lateral wall 410 has a curved or arcuate section. As shown in FIG. 16, the proximal lateral wall 410 has a curvature Cp, whereas the distal lateral wall 41 has a curvature Cd, where the curvature Cp is smaller than or equal to the curvature Cd. These curvatures Cp, Cd of the lateral walls 41 contribute to substantially conform to the curvature of the dental arches when in place. Thus, the upper groove 430 and the lower groove 440 are curved grooves bordered by curved lateral walls 410.

The second brush head 200 also comprises brush elements 61, 623, 624 which are supported by the support 400 and which extend inside the upper groove 430 and the lower groove 440 for the joint brushing of the upper teeth and the lower teeth.

The brush elements 61, 623, 624 comprise lateral brush elements 61 which are supported by the lateral walls 410, and transverse brush elements 623, 624 which are supported by the transverse wall 420. The brush elements 61, 623, 624 are securely fastened to the support 400 as described hereinafter, and are therefore not removable as is the case in the first brush head 2.

Thus, a distinction should be made between:
upper lateral brush elements 61 which are disposed opposite each other, which extend into the upper groove 430 and which are provided for the joint brushing of the inner and outer faces of the upper teeth; and
lower lateral brush elements 61 which are disposed opposite each other, which extend into the lower groove 440 and which are provided for the joint brushing of the inner and outer faces of the lower teeth.

The upper lateral brush elements 61 comprise elements fastened on the proximal lateral wall 410 opposite (or facing) the elements fastened on the distal lateral wall 410. Because of the first curvature of the lateral walls 410 and therefore of their non-parallelism, these upper lateral brush elements 61 have a relative inclination, but they remain opposite each other for the joint brushing of the inner and outer faces of the upper teeth. The same applies to the lower lateral brush elements 61.

Distinction should also be made between:
upper transverse brush elements 623 which extend into the upper groove 430 and which are provided for the joint brushing of the occlusal faces of the upper teeth; and lower transverse brush elements 624 which extend into the lower groove 440 and which are provided for the joint brushing of the occlusal faces of the lower teeth.

Like the first brush head 2, the second brush head 200 further comprises an oscillatory device (not fully shown in FIGS. 13 to 17) adapted to impart an oscillatory movement to the support 400, and in particular a reciprocating oscillatory movement according to a direction parallel to the transverse direction Y, where the oscillatory device is carried by a main sleeve 10 intended to be removably mounted on the upper end 30 of the handle 3.

The oscillatory device comprises:

a rigid movable part 700 (partially shown in FIG. 17) on which the support 400 is mounted;

a drive shaft coupled to the movable part 700 to drive in oscillation the movable part 700 and the support 400; and a case 900.

The coupling between the movable part 700 and the drive shaft is similar or equivalent to that of the first brush head 2, and it will therefore not be the subject of a new description.

The movable part 700 is an oblong part extending according to a longitudinal direction parallel to the transverse direction Y and included in the midplane PM of the support 400 and it has a mounting portion 720 which is secured to the support 4, inside the support 4. Thus, the mounting portion 720 partially passes through the support 400 in its lateral wall 420.

The movable part 700 also has a coupling portion (not shown in FIG. 17 because it is disposed inside the case 900) which is in coupling with the drive shaft according to a coupling which is similar or equivalent to that of the first brush head 2.

The movable part 700 is made integrally in one piece of a rigid material, such as a metal or plastic material.

The mounting portion 720 has:

two opposite end portions 730 which are embedded within the lateral walls 410; and between the two end portions 730, a central portion 740 which is embedded within the transverse wall 420.

In other words, the mounting portion 720 of the movable part 700 is embedded within the support 400, in particular by carrying out an overmolding of the support 400 around the mounting portion 720. Thus, the mounting portion 720 of the movable part 700 is secured to the support 400, in order to transmit, to the support 400, the oscillatory movement generated by the drive shaft coupled to the movable part 700.

The central portion 740 of the mounting portion 720 has an upper face 741 facing the upper groove 430 and an opposite lower face 742 facing the lower groove 440, where:

the upper face 741 supports a brush (not illustrated in FIG. 17 where only the mounting holes for the brush bristles are shown on the upper face 741) which will form an upper transverse brush element 623; and similarly the lower face 742 supports a brush (not illustrated in FIG. 17) which will form a lower transverse brush element 624.

To the extent that the central portion 740 is embedded within the thickness of the transverse wall 420 of the support 400, appropriate bores will be formed in the transverse wall 420 to let the brushes pass so that these open into the respective grooves 430, 440.

Each end portion 730 has an arcuate or "V" shape to define an upper face 731 facing the upper groove 430 and an opposite lower face 732 facing the lower groove 440, where:

the upper face 731 supports a brush (not illustrated in FIG. 17 where only the mounting holes of the brush bristles are shown on the upper face 741) which will form an upper lateral brush element 61; and similarly the lower face 732 supports a brush (not illustrated in FIG. 17) which will form an upper lateral brush element 61.

The arcuate or "V" shape of the end portions 730 is adapted to conform internally to the shape of the support 400 where the two lateral walls 410 are opposite each other and relatively inclined.

To the extent that each end portion 730 is embedded within the thickness of a lateral wall 410 of the support 400, adequate bores will be formed in the lateral walls 410 to let the brushes to pass so that these open into the respective grooves 430, 440.

Figure 17:
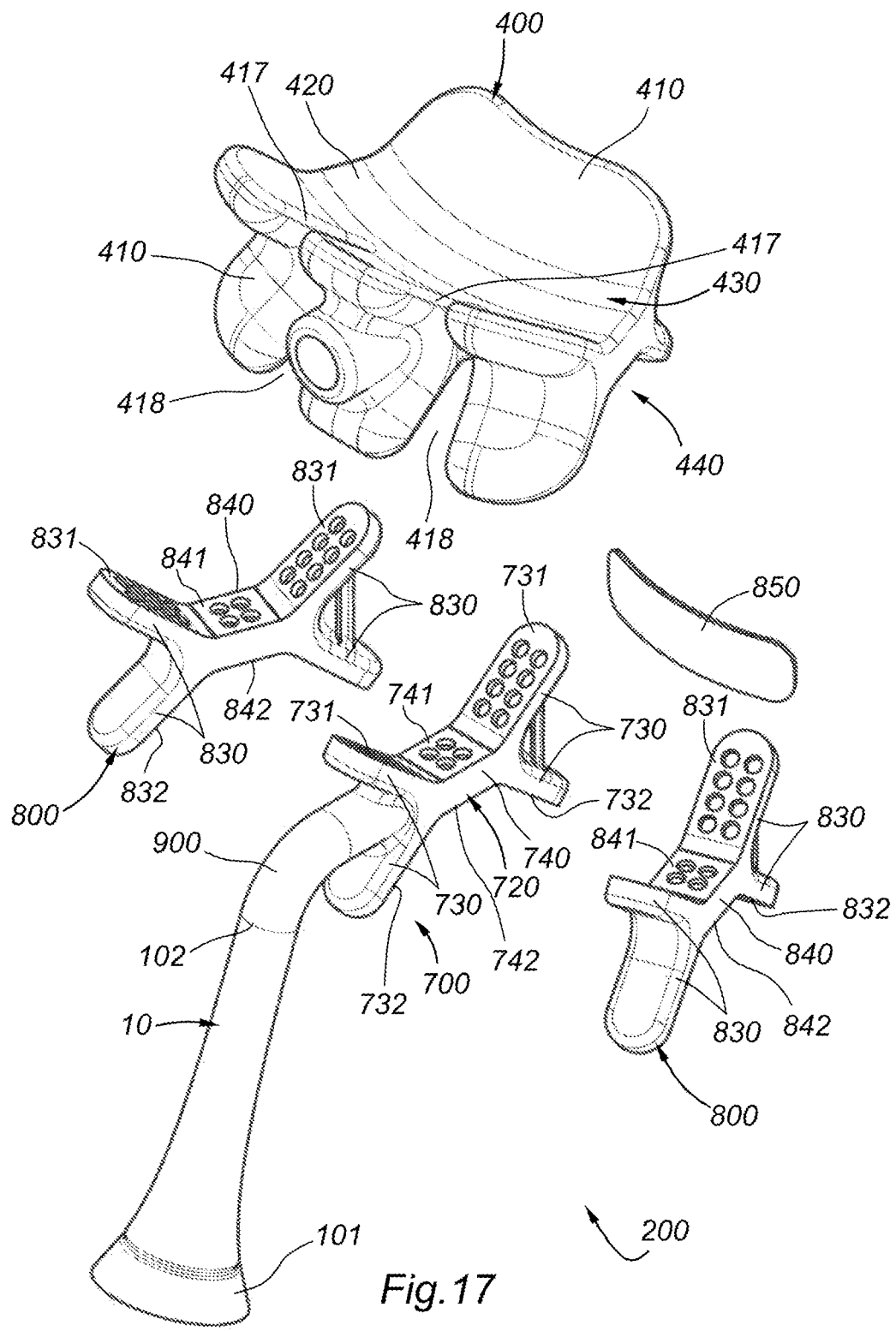
FIG. 17 is a partially exploded rear perspective view of the second brush head of FIGS. 13 to 16, without the brush elements.

Referring to FIG. 17, it should be noted that two inner parts 800 are also embedded within the support 400. Each inner part 800 is made integrally in one piece of a rigid material, such as a metal or plastic material.

Each inner part 800 has a shape similar to the mounting portion 720 of the movable part 700, that is to say that each inner part 800 has:

two opposite end portions 830 which are embedded within the lateral walls 410; and between the two end portions 830, a central portion 840 which is embedded within the transverse wall 420.

In other words, each inner part 800 is embedded within the support 400, in particular by carrying out an overmolding of the support 400 around each inner part 800.

Moreover, each inner part 800 is rigidly coupled to the mounting portion 720 of the movable part 700, in particular by a rigid link 850 fastened to both the mounting portion 720 and the two inner parts 800. The rigid link 850 is also embedded within the support 400 (in particular by overmolding) and it provides a transmission of the oscillatory movement of the mounting portion 720 to the two inner parts 800.

Moreover, the rigid link 850 between the mounting portion 720 of the movable part 700 and the two inner parts 800 is shaped so as to enable an arcuate deformation of the support 400 to take on an arcuate conformation, and thus to conform to the dental arches. The flexibility of the rigid link 850 is made by using an arcuate part, made of a rigid material such as a plastic.

Thus, each inner part 800 is secured to the support 400 and to the mounting portion 720 of the movable part 700, in order to transmit, to the support 400, the oscillatory movement generated by the drive shaft coupled to the movable part 700.

The two inner parts 800 are disposed on either side of the movable part 700, on either side of the midplane PM. Moreover, the notches 417, 418 are provided between the mounting portion 720 of the movable part 700 and each of the two inner parts 800.

The central portion 840 has an upper face 841 facing the upper groove 430 and an opposite lower face 842 facing the lower groove 440, where:

the upper face 841 supports a brush (not illustrated in FIG. 17 where only the mounting holes of the brush bristles are shown on the upper face 841) which will form an upper transverse brush member 623; and similarly the lower face 842 supports a brush (not illustrated in FIG. 17) which will form a lower transverse brush element 624.

To the extent that the central portion 840 is embedded within the thickness of the transverse wall 420 of the support 400, appropriate bores will be formed in the transverse wall 420 to let the brushes pass so that these open into the respective grooves 430, 440.

Each end portion 830 has an arcuate or "V" shape in order to define an upper face 831 facing the upper groove 430 and an opposite lower face 832 facing the lower groove 440, where:

the upper face 831 supports a brush (not illustrated in FIG. 17 where only the mounting holes of the brush bristles are shown on the upper face 741) which will form an upper lateral brush element 61; and similarly the lower face 832 supports a brush (not illustrated in FIG. 17) which will form a lower lateral brush element 61.

The arcuate or "V" shape of the end portions 830 is adapted to conform internally to the shape of the support 400 where the two lateral walls 410 are opposite each other and relatively inclined.

To the extent that each end portion 830 is embedded in the thickness of a lateral wall 410 of the support 400, appropriate bores will be formed in the lateral walls 410 to let the brushes pass so that these open into the respective grooves 430, 440.

Of course, the above-mentioned two examples of implementation are not limiting and other improvements and details may be made to the brush head according to the present disclosure, yet without departing from the scope of the present disclosure where other oscillatory devices or other mechanisms adapted to impart an oscillatory movement to the support may for example be made.

As an example of a variant, the movable part 7 and the drive shaft 8 may be coupled while being collinear, or at least parallel, such that the handle 3 will be parallel to the longitudinal direction of the movable part 7. In such a conformation, the handle 3 will be close to the horizontal while being included in the plane of symmetry of the face at the beginning of the brushing (somehow like a cigar held in the mouth), which again provides an ergonomic holding of the toothbrush.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A brush head for an electric toothbrush, the brush head comprising:

a support comprising two lateral walls connected by a transverse wall defining, on either side of the transverse wall, an upper groove and a lower groove, wherein the two lateral walls and the transverse wall are shaped to support, inside the upper groove, opposing upper lateral brush elements and upper transverse brush elements, and inside the lower groove, opposing lower lateral brush elements and lower transverse brush elements; and an oscillatory device adapted to impart an oscillatory movement to the support;

wherein the support is elastically deformable to arcuately deform, and includes a midplane intersecting the two lateral walls and the transverse wall such that the support is shaped to support the upper lateral brush elements, the upper transverse brush elements, the lower lateral brush elements, and the lower transverse brush elements on either side of the midplane;

wherein the oscillatory device comprises a movable part on which the support is mounted, and a drive shaft coupled to the movable part to drive in oscillation the movable part and the support according to an oscillatory movement comprising at least one reciprocating component in translation according to a direction orthogonal to the midplane, wherein the movable part and the drive shaft extend substantially in the midplane of the support, and wherein the movable part of the oscillatory device has a mounting portion which passes through the support in the two lateral walls, the mounting portion having a central portion extending in the transverse wall and includes an upper face facing the upper groove and a lower face facing the lower groove.

2. The brush head according to claim 1, wherein the support is made at least partially of an elastically deformable flexible material.

3. The brush head according to claim 2, wherein the support is integrally made of an elastically deformable flexible material.

4. The brush head according to claim 1, wherein at least one of the lateral walls of the support has at least one furrow forming a folding primer or at least one notch to allow arcuate deformation.

5. The brush head according to claim 1, wherein the transverse wall has through apertures shaped to receive transverse brush elements having upper brushes forming the upper transverse brush elements, and opposite lower brushes forming the lower transverse brush elements.

6. The brush head according to claim 1, wherein the upper groove and the lower groove are rectilinear grooves bordered by substantially parallel and planar lateral walls.

7. The brush head according to claim 1, wherein the upper groove and the lower groove are curved grooves bordered by curved lateral walls.

8. The brush head according to claim 1, wherein at least one of the lateral walls and the transverse wall has through apertures shaped to receive, by nesting, brush elements.

9. The brush head according to claim 8, further comprising a brush kit comprising at least one brush element adapted to be nested into one through aperture of the through apertures provided for the brush head.

10. The brush head according to claim 9, wherein the at least one brush element comprises a base having a peripheral contour including at least one slot or at least one protruding lug.

11. The brush head according to claim 8, wherein each aperture has an inner border in which at least one protruding lug or at least one slot is provided such that each brush element can be nested into an aperture by a cooperation of the at least one protruding lug in the at least one slot.

12. The brush head according to claim 1, wherein the movable part of the oscillatory device is a rigid part.

13. The brush head according to claim 1, wherein the movable part of the oscillatory device extends at a level of the transverse wall of the support.

14. The brush head according to claim 1, wherein the upper face and the lower face of the central portion of the mounting portion of the movable part support brushes forming an upper transverse brush element and a lower transverse brush element, respectively.

15. The brush head according to claim 1, wherein the mounting portion of the movable part is nested into two through mounting orifices formed opposite each other in a respective lateral wall among the two lateral walls of the support.

16. The brush head according to claim 1, wherein the mounting portion of the movable part is embedded within the support.

17. The brush head according to claim 16, wherein the mounting portion of the movable part has two opposite end portions which are embedded within the respective lateral walls, or each end portion has:
- an upper face facing the upper groove, the upper face supporting a brush forming an upper lateral brush element which passes through the corresponding lateral wall to open into the upper groove; and
- a lower face facing the lower groove, the lower face supporting a brush forming a lower lateral brush element which passes through the corresponding lateral wall to open into the lower groove.

18. The brush head according to claim 1, wherein the movable part has a coupling portion coupled to the drive shaft via coupling elements for converting a rotation of the drive shaft into a reciprocating oscillation of the movable part and the support.

19. The brush head according to claim 18, wherein the coupling elements comprise an oblong slit formed in the coupling portion and an eccentric cam on an upper end of the drive shaft, the eccentric cam adapted to engage the oblong slit such that a rotation of the drive shaft is converted into a reciprocating oscillation of the movable part and the support.

20. The brush head according to claim 1 further comprising the upper lateral brush elements and the lower lateral brush elements supported by the two lateral walls of the support, and the upper transverse brush elements and the lower transverse brush elements supported by the transverse wall of the support.

21. The brush head according to claim 1 further comprising a main sleeve at least partially surrounding the drive shaft, wherein the movable part is mounted on the main sleeve, the main sleeve removably mounted on a handle housing an electric motor coupled to an output shaft adapted for coupling with the drive shaft.

22. An electric toothbrush comprising a handle housing an electric motor coupled to an output shaft and a brush head according to claim 21, wherein:
- the drive shaft of the oscillatory device of the brush head is coupled to the movable part to drive in oscillation the movable part and the support and to the output shaft, and
- the oscillatory device is carried by the main sleeve removably mounted on an upper end of the handle.

\* \* \* \* \*